United States Patent
Bourbonnais et al.

(10) Patent No.: US 10,169,429 B2
(45) Date of Patent: Jan. 1, 2019

(54) DATA CACHING IN HYBRID DATA PROCESSING AND INTEGRATION ENVIRONMENT

(71) Applicant: International Business Machines Corporation, Armonk, NY (US)

(72) Inventors: Serge Bourbonnais, Palo Alto, CA (US); Zhen Hua Dong, Beijing (CN); Nan Jiang, Beijing (CN); Xiao Li, San Jose, CA (US); Hong Min, Poughkeepsie, NY (US); Gong Su, New York, NY (US); En Zhong Wang, Beijing (CN); Ke Wei Wei, Beijing (CN); Xi Long Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 14/938,474

(22) Filed: Nov. 11, 2015

(65) Prior Publication Data

US 2017/0132293 A1    May 11, 2017

(51) Int. Cl.
*G06F 17/30* (2006.01)
*G06F 12/12* (2016.01)

(52) U.S. Cl.
CPC .. *G06F 17/30545* (2013.01); *G06F 17/30424* (2013.01); *G06F 17/30498* (2013.01); *G06F 17/30595* (2013.01); *G06F 12/12* (2013.01); *G06F 2212/60* (2013.01)

(58) Field of Classification Search
USPC ......................................................... 707/705
See application file for complete search history.

(56) References Cited

U.S. PATENT DOCUMENTS

| | | | |
|---|---|---|---|
| 6,601,062 B1 * | 7/2003 | Deshpande | G06F 17/30457 |
| 6,763,357 B1 * | 7/2004 | Deshpande | G06F 17/30457 |
| 7,287,048 B2 | 10/2007 | Bourbonnais et al. | |
| 8,738,587 B1 | 5/2014 | Bitincka et al. | |
| 9,674,296 B2 * | 6/2017 | Ghandeharizadeh | ............... |
| | | | H04L 67/2852 |
| 2003/0195862 A1 | 10/2003 | Harrell, Jr. | |
| 2009/0287666 A1 * | 11/2009 | DeKimpe | G06F 17/30592 |
| 2011/0106574 A1 * | 5/2011 | Demarcken | G06F 17/30457 |
| | | | 705/5 |

(Continued)

*Primary Examiner* — Kim T Nguyen
(74) *Attorney, Agent, or Firm* — Rabin Bhattacharya; Michael J. Chang, LLC (57) ABSTRACT

An integrated data processing system with two-tier data caching system and techniques for use thereof in a hybrid RDBMS and BDS computing environment are provided. In one aspect, the system is RDBMS-centric and uses two caches, one on the RDBMS side (1st tier) and the other on the BDS side (2nd tier). In another aspect, a DRDA wrapper on the BDS side enables the RDBMS to communicate with the BDS as if the BDS is another RDBMS. This is advantageous because the RDBMS already supports the DRDA protocol standard. In yet another aspect, the DRDA wrapper performs the data transformation needed when transferring cached objects between the RDBMS cache and BDS cache because RDBMS and BDS save data objects in different formats. This is advantageous because it offloads the computation from RDBMS to BDS therefore reducing the performance impact on RDBMS for its normal query and transaction processing.

20 Claims, 6 Drawing Sheets

(56) References Cited

U.S. PATENT DOCUMENTS

2014/0279944 A1* 9/2014 Ghandeharizadeh ........................ G06F 17/30371
  707/690
2015/0220628 A1* 8/2015 Zhong ............... G06F 17/30902
  707/737

* cited by examiner

DATA CACHING IN HYBRID DATA PROCESSING AND INTEGRATION ENVIRONMENT

FIELD OF THE INVENTION

The present invention relates to data caching in a hybrid data processing environment, and more particularly, to a two-tier data caching system in a hybrid Relational Database Management System (RDBMS) and Big Data System (BDS) computing environment.

BACKGROUND OF THE INVENTION

Traditional Relational Database Management Systems (RDBMS) such as DB2® available from International Business Machines Corporation and Oracle® available from Oracle Corporation, etc., and emerging Big Data Systems (BDS) such as Hadoop® and Spark™ available from Apache™ are typically two siloed (i.e., isolated) data management systems, each having their own data format, query/programming language, and computational model, etc. Computations done within one system typically do not involve data in the other system, and vice versa. RDBMS typically handles structured data, while BDS typically handles semi- and un-structured data.

As business analytics and data mining become increasingly deeper and more sophisticated, it is often required that data from both systems be processed together. This is currently done through so called "data connectors," which transfer data from one system to another as needed. However, as the data involved in the computations can be very large (particularly those in BDS), frequent data transfer between the two systems can result in high performance loss.

Accordingly, improved techniques for integrating RDBMS and BDS data processing would be desirable.

SUMMARY OF THE INVENTION

In one aspect of the invention, a method for processing a query involving data objects both in a Relational Database Management System (RDBMS) and in a Big Data System (BDS) is provided. The method includes the steps of: parsing the query into requests for RDBMS data objects and BDS data objects; determining whether the RDBMS data objects are present in a RDBMS cache; retrieving the RDBMS data objects from the RDBMS cache if the RDBMS data objects are present in the RDBMS cache, otherwise determining whether the RDBMS data objects are present in a BDS cache; and retrieving the RDBMS data objects from the BDS cache if the RDBMS data objects are present in the BDS cache, otherwise computing the RDBMS data objects; determining whether the BDS data objects are present in the RDBMS cache; retrieving the BDS data objects from the RDBMS cache if the BDS data objects are present in the RDBMS cache, otherwise retrieving the BDS data objects: from the BDS cache if the BDS data objects are present in the BDS cache, or as computed by the BDS if the BDS data objects are not present in the BDS cache.

In another aspect of the invention, an integrated data processing (IDP) system is provided, which supports a two-tier data caching system and techniques for use thereof in a hybrid Relational Database Management System (RDBMS) and Big Data System (BDS) computing environment. The system includes: a RDBMS engine having a host RDBMS cache (called RD cache); and a BDS engine having a distributed BDS cache (called BD cache), wherein the RDBMS engine is configured to be a contact and control point of the system, parse a query into requests for RDBMS data objects and BDS data objects, determine whether the RDBMS data objects are present in a RD cache, retrieve the RDBMS data objects from the RD cache if the RDBMS data objects are present in the RD cache, otherwise determine whether the RDBMS data objects are present in a BD cache, retrieve the RDBMS data objects from the BD cache if the RDBMS data objects are present in the BD cache, otherwise compute the RDBMS data objects and save them in a RD cache; determine whether the BDS data objects are present in a RD cache, and retrieve the BDS data objects from the RD cache if the BDS data objects are present in the RD cache, otherwise determine if the BDS data objects are present in a BD cache, and retrieve the BDS data objects from the BD cache if the BDS data objects are present in the BD cache, otherwise instruct the BDS engine to compute the BDS data objects, save them in a BD cache, and transfer a copy of the BDS data objects to a RD cache.

The present IDP preferably employs a novel mechanism to perform data transformation when cached data objects are moved between a RD cache and a BD cache. One of the challenges with the two-tier caching system with RD cache and BD cache that does not present in other caching systems such as web caching is the need for data transformation. Because RDBMS and BDS store data in very different data formats. When a data object in a BD cache is copied to a RD cache, it needs to be transformed from BD data format into RD data format, and vice versa. A native approach that performs the transformation on the RDBMS can negatively impact the normal query and transaction performance due to the additional CPU resource required for performing the data transformation. The present techniques provide a novel mechanism to offload the transformation to the BDS, which typically has abundant CPU resource, without requiring change on the RDBMS through the use of the existing Distributed Relational Database Architecture (DRDA) protocol standard supported by many well-known RDBMS systems such as DB2 and Oracle mentioned above.

A more complete understanding of the present invention, as well as further features and advantages of the present invention, will be obtained by reference to the following detailed description and drawings.

DETAILED DESCRIPTION OF PREFERRED EMBODIMENTS

As provided above, Relational Database Management Systems (RDBMS) and Big Data Systems (BDS) are often operated as isolated systems. However, with deeper analytical and data mining demands, it is often the case that data from both of these systems has to be processed together, which is what will be referred to herein as integrated data processing or IDP. IDP means that one system needs to access data in the other system.

Advantageously, provided herein are IDP caching-based techniques to improve the performance of integrated data processing between RDBMS and BDS. As will be described in detail below, the performance improvement is achieved through introducing computation result caching in both RDBMS and BDS. Also provided herein are mechanisms to maintain cache consistency and to incrementally update the caches when underlying data change.

Figure 1:
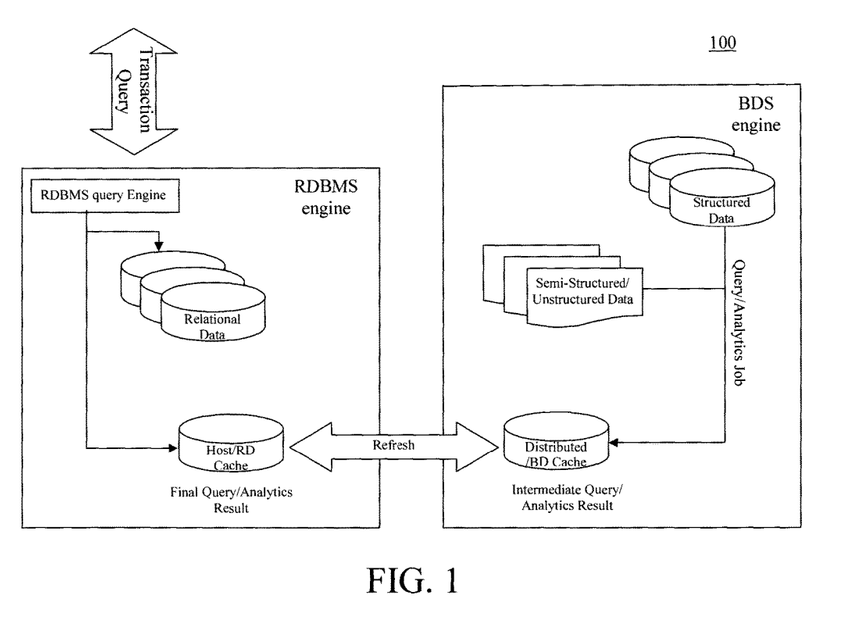
FIG. 1 is a diagram illustrating an exemplary two-tier caching-based integrated data processing (IDP) system according to an embodiment of the present invention.

In order to reduce the amount of data transfer between the RDBMS and the BDS and to improve processing performance, a two-tier caching scheme is employed herein. See, for example query processing system 100 of FIG. 1. As shown in FIG. 1, system 100 includes at least one RDBMS engine and at least one BDS engine. The RDBMS engine can access and process data that resides in a relational database. The BDS engine can access and process (structured, semi-structured, unstructured) data that resides in a big data platform. The present two-tier caching scheme includes: a Host Cache that resides in the RDBMS (which is also referred to herein as the "RD Cache"), and a Distributed Cache that resides in the BDS (which is also referred to herein as the "BD Cache"). This caching mechanism is referred to herein as IDP caching since it integrates the data processing output of the RDBMS engine and the BDS engine.

It is notable that the present techniques focus on a RDBMS-centric IDP system. Namely, two types of IDP systems are identified herein, RDBMS-centric and BDS-centric. In a RDBMS-centric system, the BDS is attached to the RDBMS via data connectors as an "extension." As will be described in detail below, the whole system still appears to the users as an RDBMS. Namely, transferring data to/from the BDS is managed transparently by the RDBMS. In a BDS centric system, the "extension" goes the other way around.

Referring to FIG. 1, since the present example focuses on an RDBMS-centric system, the Host Cache (RD cache), being closer to the RDBMS, is the first tier caching, while the Distributed Cache (BD cache) is the second tier caching. Since, as shown in FIG. 1, the final query/analytics results are produced in the RDBMS, the goal is to keep as much data and intermediate computation results as possible in the Host Cache. The two-tier cache is populated when processing a query ("Transaction Query") which joins two tables, one in RDBMS and the other in BDS.

As will be described in detail below, when the RDBMS performs an operation such as JOIN, it first checks whether the necessary intermediate results already exist in the Host Cache or the Distributed Cache before it recomputes or instructs the BDS to recompute the intermediate results. What data is available in the Host Cache and Distributed Cache should be stored as meta-data to be consulted during run time.

Thus, if an intermediate result can be found in the Host Cache, it completely eliminates any data transfer from the BDS to the RDBMS. If an intermediate result cannot be found in the Host Cache but can be found in the Distributed Cache, some amount of data transfer from the BDS to the RDBMS is still necessary. However, the intermediate results are typically much smaller than the raw data from which the intermediate results are generated. Therefore, a hit in the Distributed Cache can also significantly reduce the amount of data transfer from the BDS to the RDBMS.

Thus, generally the RDBMS is kept as a control point, and the present techniques provide an efficient and effective way to access BDS data via a two-level caching system. Thus the present techniques address a hybrid data processing scenario where an incoming query involves joining data objects in RDBMS and BDS. Take for instance the scenario where the RDBMS receives a query from a user requesting data that resides in the RDBMS and data that resides in the BDS. The RDBMS can handle its part, but must hand over the big data part of the request to the BDS. The RDBMS sends the big data part to the BDS, the BDS may perform computations to generate the result, and then the BDS sends the result back to the RDBMS. The RDBMS joins the bid data object with its data object and reports the result to the user.

If the RDBMS automatically forwards every big data request that comes in and/or if the RDBMS and BDS each time performs the necessary computations to generate the requested data objects, the response time would be unacceptably slow. However, with the present system the RDBMS and BDS data objects from previous queries are stored in the Host Cache and/or the Distributed Cache. The data stored in these caches can be leveraged by the system before any recomputations are performed. In the best scenario, the intermediate results for the query are contained in the host cache. In that case no data transfer from the BDS to the RDBMS is necessary. If the intermediate results are not present in the host cache, but are in the BDS cache, then the only cost incurred is that of the data transfer from the BDS to the RDBMS. A recomputation is only performed when the result cannot be found in either cache.

Further, the data is typically stored in the RDBMS and the BDS in different formats. Thus, marshalling of the data transferred into the RDBMS from the BDS is often needed to transform the data into an RDBMS-compatible format (e.g., Structured Query Language or SQL). If this transformation process is carried out on the RDBMS/host side of the system, it is computationally very expensive. However, if the data transformation can be carried out on the BDS side which has more resources, then the performance impact on the RDBMS for its normal query and transaction processing can be reduced. Further, as described in detail below, a Distributed Relational Database Architecture or DRDA wrapper can be implemented on the BDS side such that the BDS appears as another database on the host side (i.e., the host database thinks it is talking to another database). Thus a standard RDBMS can interact with the BDS as if it were a RDBMS.

The data objects used in the following examples are tables. A table format is a common way to represent data in a database. Each table is a collection of data entries organized into columns and rows. The columns, also referred to as fields, contain information about each record in the table.

For instance, common fields might be name, address, etc. The rows or records contain data for a specific entry in the table.

Figure 2:
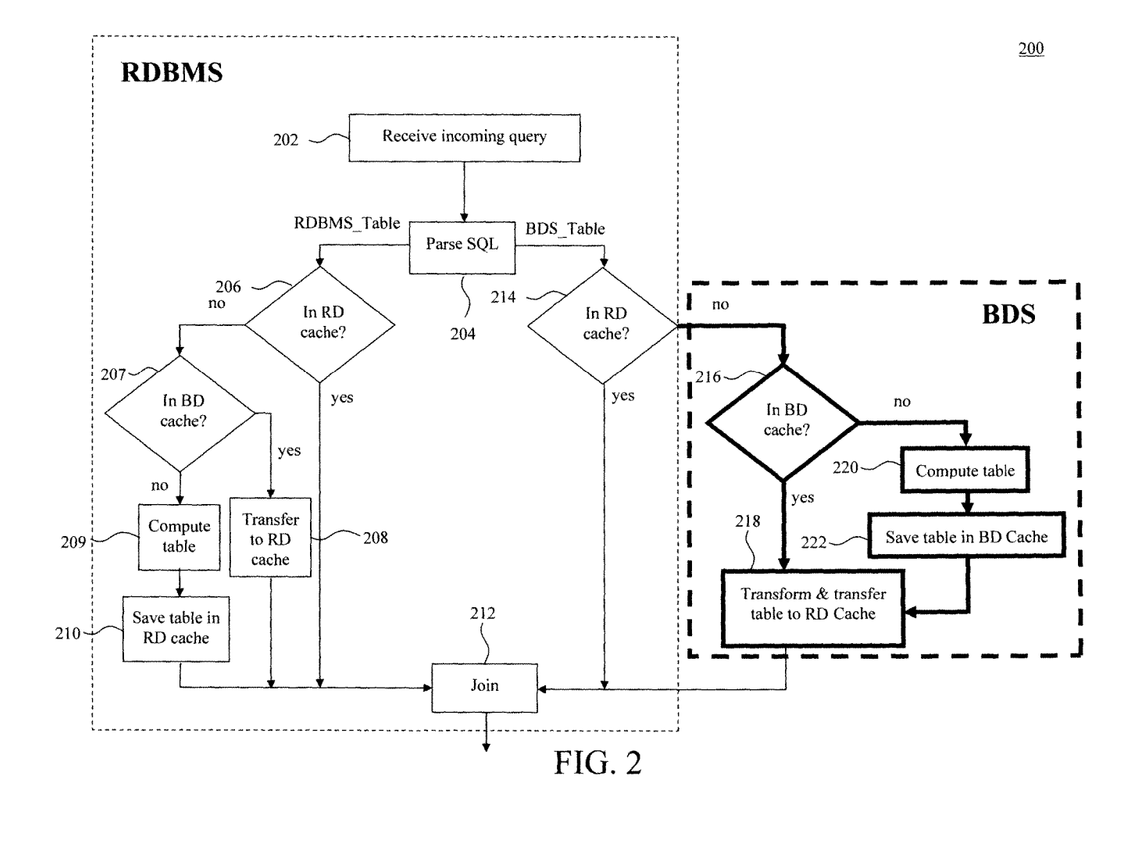
FIG. 2 is a diagram illustrating an exemplary methodology for processing a query that involves joining data objects, one in a Relational Database Management System (RDBMS) and the other in a Big Data System (BDS) according to an embodiment of the present invention.

FIG. 2 provides an exemplary methodology 200 for processing a query. As provided above, the query in question involves joining data objects or tables, one in RDBMS and the other in BDS. In step 202, an incoming query is received by the RDBMS/host engine of system 100. The host parses the query into those data objects which it can handle from those that need to be forwarded to the BDS engine (i.e., it parses the RDBMS_Table from the BDS_Table). See step 204. However, prior to forwarding the BDS part of the request, the RDBMS engine will attempt to retrieve the (saved) result from its RD cache. This is the first of the two-tier caching system. If the request is forwarded to the BDS engine, an attempt will be made on the BDS side to access the (saved) result from its BD cache. This is the second of the two-tier caching system. See below.

With regard to the computations performed on the RDBMS side, the host engine will attempt to retrieve the (precomputed) result from its own host cache (RD cache). Namely, if the host engine has previously computed the data object requested in the incoming query, then that data object (RDBMS_Table) might already be present in the host cache. It is notable that the data objects/tables computed in the RDBMS/BDS and/or stored in the respective caches may be referred to herein as intermediate data objects since the RDBMS and BDS tables are joined to produce the final result.

Specifically, in step 206 a determination is made as to whether the requested RDBMS data object is present in the RD cache. If the requested data object is already present in the host cache (yes), then that data object can be joined with the BDS data object (see step 212, described below). On the other hand, if it is determined in step 206 that the requested RDBMS data object is not already present in the RDBMS cache (no) then in step 207, a determination is made as to whether the requested RDBMS data object is present in the BD cache. If the requested data object is already present in the distributed cache (yes), then in step 208 the RDBMS data object is transferred from the distributed/BD cache to the RD cache and can be joined with the BDS data object (see step 212, described below). On the other hand, if it is determined in step 207 that the requested RDBMS data object is not already present in the BDS cache (no) then, in step 209, the data object (i.e., table) is computed and, in step 210, the data object is stored in the host cache. As provided above, by storing the newly computed data object in the host cache, it will avoid recomputation should a request for the same RDBMS data object occur in the future. With regard to managing the data stored in the host cache, an exemplary process for evaluating and evicting data objects from the host cache is provided below.

A similar process is employed with regard to the BDS part of the query. Namely, an attempt will be made to retrieve the requested (precomputed) BDS data object from the host cache (RD cache). Namely, as will be described in detail below, when a request is forwarded to the BDS side, and a data object is retrieved (i.e., either from the distributed cache (BD cache) or computed by the BDS engine), that data object (following data marshalling) is transferred to the RD cache. Thus, the RD cache is populated with both RDBMS and BDS-based data objects.

Specifically, in step 214 a determination is made as to whether the requested BDS data object is present in the RD cache. If the requested data object is already present in the host cache (yes), then that data object can be joined with the RDBMS data object (see step 212, described below). In that case, no data transfer is involved in responding to the query.

On the other hand, if it is determined in step 214 that the requested data BDS data object is not already present in the host cache (no), only then is the BDS portion of the request forwarded to the BDS engine. For sake of clarity, in FIG. 2 the BDS-based steps of methodology 200 are shown in bold, while the RDBMS steps are non-bold.

When a forwarded request is received by the BDS engine, an attempt is made to retrieve the result from the BD cache (the second of the two-tier caching scheme). Note that RDBMS data objects evicted from the RD cache may be transferred to the BD cache. Therefore, there might be data objects, both from RDBMS and BDS, present in the BD cache but not in the RD cache.

Specifically, in step 216 a determination is made as to whether the requested BDS data object is present in the distributed/BD cache. If the requested data object is already present in the distributed cache (yes), then that data object is transformed and transferred to the RD/host cache in step 218, and in step 212 the BDS data object can be joined with the RDBMS data object. In this scenario, while data transfer is needed, the amount of data is significantly less than would be the case if the raw data (needed to regenerate the result) was exchanged.

On the other hand, if it is determined in step 216 that the requested data BDS data object is not already present in the distributed cache (no), only then is the BDS portion of the request computed by the BDS engine. Namely, the request has to pass through two levels of caches first on the host side, and then on the BDS side, before this computation is performed.

When computation of the data object is necessary, it is performed by the BDS engine in step 220 and, in step 222 the data object is stored in the BD cache. As per step 218, the computed data object is transferred to the RD cache. However, as provided above, the data stored in the RDBMS and that stored in the BDS are typically in different formats. Thus, in order for the BDS data to be understood by the RDBMS system, the data will need to be transformed into an RDBMS-compatible format. This transformation process can be computationally expensive, especially if carried out at the host side. Thus, according to an exemplary embodiment, all such transformations are carried out (as per step 218) on the BDS side, i.e., prior to transferring the data objects to the RD cache. This tactic leverages the greater level of processing resources available in the BDS.

Further, according to an exemplary embodiment, a Distributed Relational Database Architecture (DRDA) wrapper is employed on the BDS side such that the BDS appears as another standard RDBMS to the RDBMS side. As a result, the RDBMS side can communicate with the BDS side without any change because it already supports the DRDA protocol. In addition, the DRDA wrapper performs the required data transformation between the RDBMS data format and the BDS data format, therefore offloading the data transformation computation from the RDBMS to the BDS.

As per step 212, the host RDBMS engine joins the intermediate result data objects (i.e., RDBMS_Table and BDS_Table). The final result (from joining the data objects) can be reported back to the user.

Figure 3:
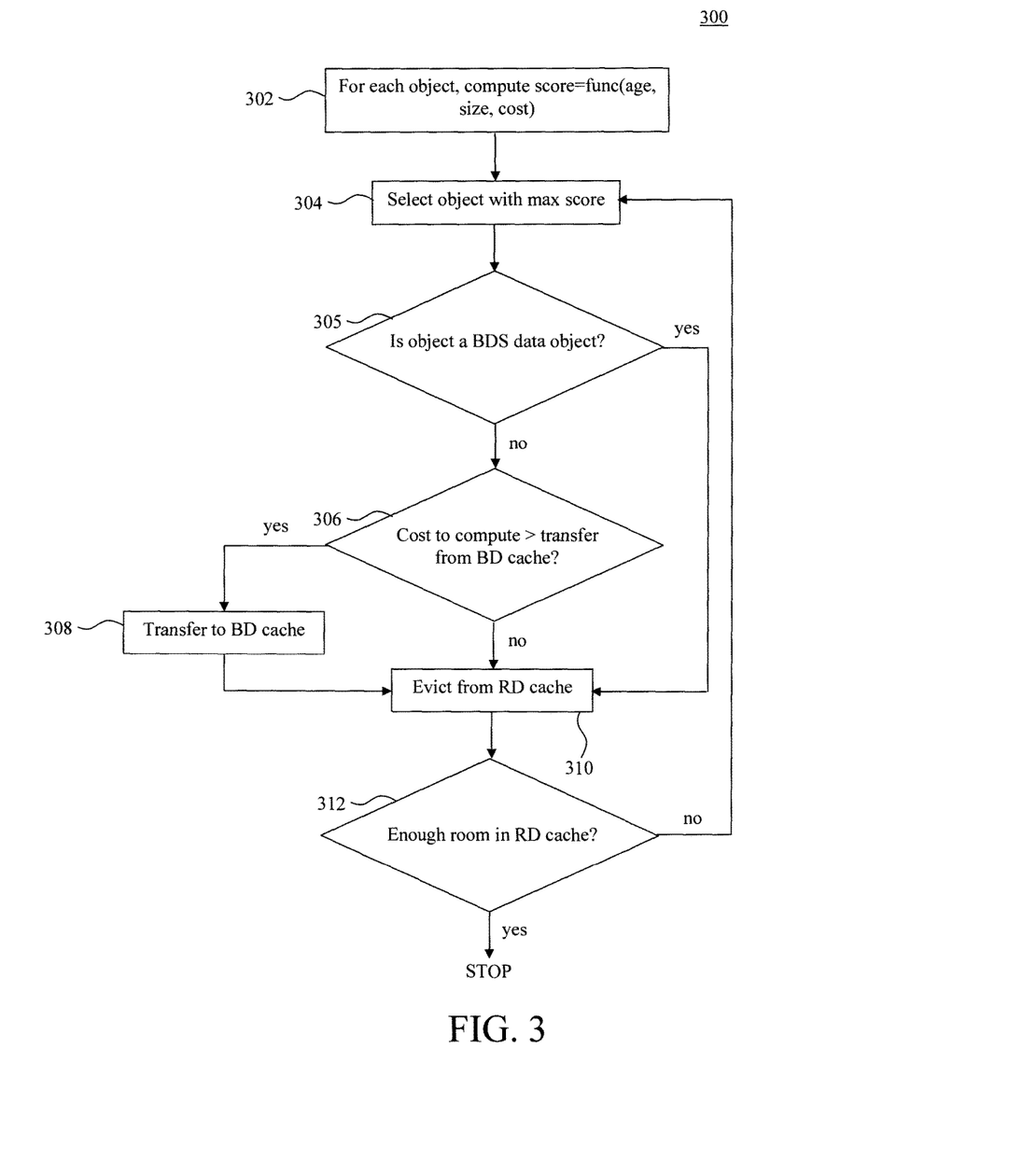
FIG. 3 is a diagram illustrating an exemplary methodology for managing data stored in the RD cache according to an embodiment of the present invention.

FIG. 3 is a diagram illustrating an exemplary methodology 300 for managing data stored in the RD cache. By way of example only, methodology 300 may be performed when the caching space on the RDBMS is used up. Specifically, as described in conjunction with the description of FIG. 2, above, for each RD cached BDS data object (potentially filtered by certain conditions due to predicate push down), there will always be a corresponding BDS data object in the BD cache (see, for example, step 222 of methodology 200, where the BDS data object (pre-transformation) is stored in the BD cache). So there is not a need to push a RD cached BDS data object to the BD cache. Pushing data objects out to the BD cache (as described below) only happens to a host cached RDBMS data object, whose content is generated locally by RDBMS.

Specifically, in step 302, a score is calculated for the data objects (i.e., RDBMS and BDS data objects) in the RD cache. As provided above, there is no need to push a RD cached BDS data object to the BD cache since a corresponding data object is already present in the BD cache. Thus, a RD cached BDS data object is simply discarded. According to an exemplary embodiment, the score is a function of age, size, and cost of the data object. For instance, the function may be chosen such that, the older the cached object, the higher the score (because it is preferable to evict cached objects that have not been accessed for a long time); the bigger the size of the cached object, the higher the score (because it is preferable to evict cached objects that can make more room); and the lower the cost of computing the cached object, the higher the score (because it is preferable to evict cached objects that can be easily (re)computed). For example, a simple example of the function could compute the score as:

$$score=age*size/cost.$$

In step 304, the RDBMS data object with the highest calculated score is selected, and in step 305 a determination is made to whether the data object is a RDBMS data object or a BDS data object. If it is determined in step 305 that (yes) the data object is a BDS data object, then (as per step 310) the data object is simply discarded. On the other hand, if it is determined in step 305 that (no) the data object is not a BDS data object, then the data object is a RDBMS data object and in step 306 a determination is made as to whether the cost to compute the (selected) data object is greater than the cost to retrieve the data object from the BD cache. The rationale here is that one would only transfer the data object to the BD cache if the cost to recompute the data object (when needed) exceeds the cost to retrieve the data back from the BD cache. If the data object can simply be recomputed in the RDBMS more easily (less expensively) than transferring the data object back from the BD cache, then it does not make sense to save it remotely in the BD cache. The RDBMS can make such estimation by monitoring and storing various statistics of the processing time it takes to compute a RDBMS data object, as well as the statistics of transferring time it takes to retrieve a RDBMS data object from the BD cache.

Thus, if it is determined that (yes) it is more expensive to recomputed the RDBMS data object (upon request) than it would be to retrieve it from the BD cache then, in step 308, the data object is transferred to the BD cache. On the other hand, if the data object can simply be recomputed (if/when needed) at less of a cost than it would be to retrieve it back from the BD cache (no) then, in step 310, the data object is evicted from the RD cache.

In step 312 a determination is made as to whether the above-described steps have freed up enough room in the RD cache. If it is determined that (yes) enough room has been freed up in the RD cache, then the process is complete. On the other hand, if it is determined that (no) more room needs to be freed up in the RD cache, then the steps of methodology 300 (beginning at step 304) can be repeated with the data object originally having the second to highest score, etc. The process can be iterated in this manner until there is sufficient room in the RD cache for new entries.

A similar process is conducted to make room when the BD cache is used up. See FIG. 4. However, the process is much simpler because, in this case, the data objects with the highest scores are simply discarded. Note that when a BDS data object is discarded from the BD cache, its corresponding copy in the RD cache must also be discarded. Specifically, in step 402, a score is calculated for the data objects (i.e., RDBMS and BDS data objects) in the BD cache. As provided above, the score used can be a function of age, size and cost of the data object, i.e., score=age*size/cost.

Figure 4:
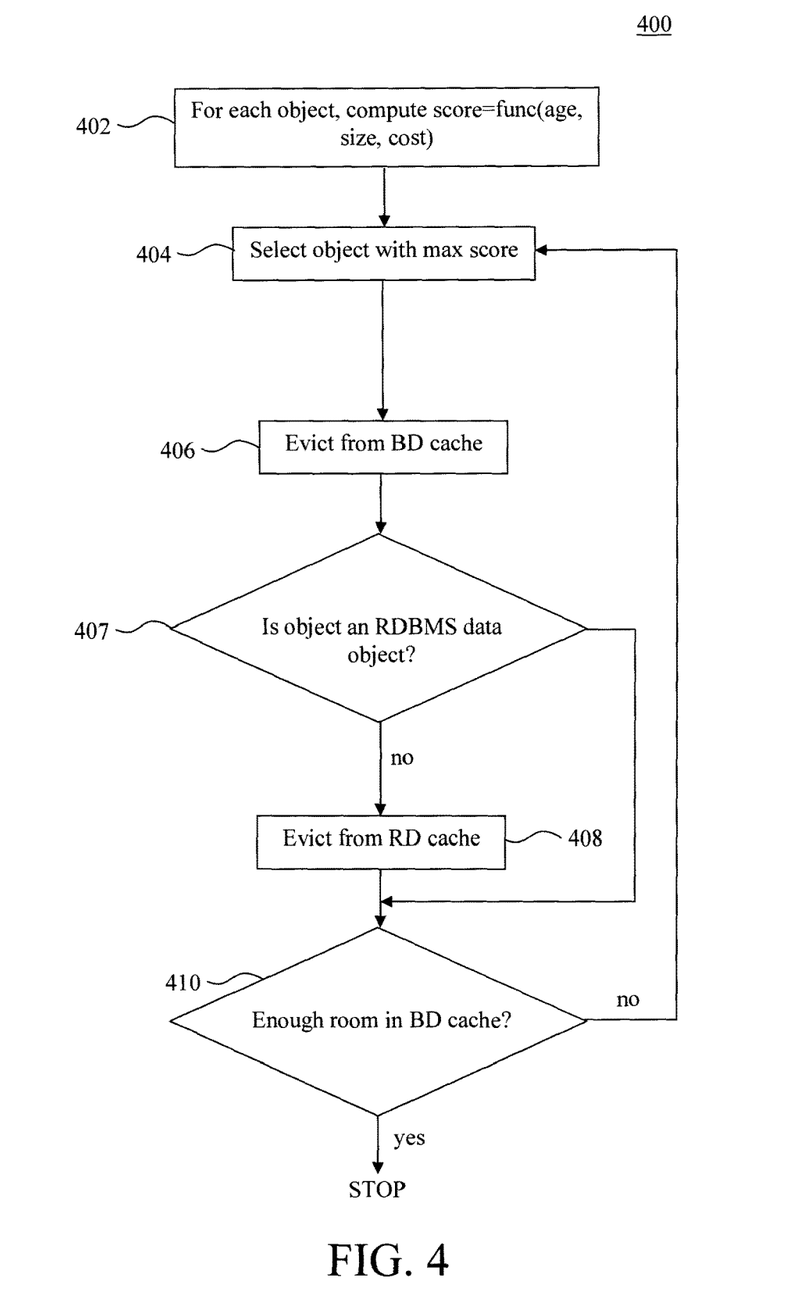
FIG. 4 is a diagram illustrating an exemplary methodology for managing data stored in the BD cache according to an embodiment of the present invention.

In step 404, the BDS data object with the highest calculated score is selected, and in step 406 the data object is evicted from the BD cache. In step 407 a determination is then made as to whether the discarded data object is a BDS data object or a RDBMS data object. If it is determined in step 407 that (yes) the data object is a RDBMS data object, then the process proceeds to step 410. On the other hand, if it is determined in step 407 that (no) the data object is not a RDBMS data object then in step 408, the corresponding data object is also evicted from the RD cache.

In step 410 a determination is made as to whether the above-described steps have freed up enough room in the BD cache. If it is determined that (yes) enough room has been freed up in the BD cache, then the process is complete. On the other hand, if it is determined that (no) more room needs to be freed up in the RD cache, then the steps of methodology 400 (beginning at step 404) can be repeated with the data object originally having the second to highest score, etc. The process can be iterated in this manner until there is sufficient room in the RD cache for new entries.

The present techniques are further illustrated by reference to the following non-limiting examples:

Example of how the present two-tier (i.e., RD (L1) and BD (L2)) cache is populated when processing a query which joins two tables, one in RDBMS and the other in BDS:

The query can look like the following:
SELECT a.name, b.rank FROM db2_table a, hadoop_table b WHERE a.id=b.id In this example, table "a" is in DB2 (RDBMS) and table "b" is in Hadoop (BDS). The steps of processing the query are as follows:

1. The query is parsed. Table "a" is processed locally. Table "b" processing is forwarded to a remote DRDA-enabled Hadoop node (catalog metadata tells which node).
2. The DRDA wrapper on Hadoop node carries out the necessary computation (such as submit MapReduce job) to generate the content for table "b."
3. Content of table "b" is saved in HDFS in certain format, e.g., CSV or JSON, etc. The table will have rows with id, rank, and possibly other data. This would be the L2 cache that resides in BDS for future queries that hit BDS table "b."
4. The DRDA wrapper on Hadoop node performs the data transformation from CSV or JSON into native DB2 result set format. It also performs predicate push down to filter the result set such that only rows with b.id are selected.
5. The filtered result set is returned to the DB2 node via DRDA. DB2 materializes the result set into a local table. This would be the L1 cache that resides in RDBMS for future queries that hit BDS table "b."

This is how the L1 and L2 cache are populated in the direction of BDS to RDBMS.

When the caching space on RDBMS is used up, a table in L1 can be evicted and pushed out to L2 (if it's decided that it should not be thrown away). This is how the L1 and L2 cache are populated in the direction of RDBMS to BDS. Note that for every L1 cached BDS table, there is always a corresponding L2 cached (unfiltered) BDS table. So there is never a need to push an L1 cached BDS table to L2. Pushing out to L2 only happens to an L1 cached RDBMS table, whose content is generated locally by RDBMS.

Example of pushing an L1 cached RDBMS table to L2 cache are as follows:
1. DB2 loads the content of table "a" in L1 cache to be pushed out (if not already in memory) and send the content in native DB2 format to the remote DRDA-enabled Hadoop node.
2. The DRDA wrapper on Hadoop node performs the data transformation from native DB2 format into a format suitable to be saved in HDFS, such as CSV or JSON, etc. This would be the L2 cache that resides in BDS for future queries that hit RDBMS table "a."
3. L1 cache of table "a" is discarded.

As with all caching systems, the cached data objects need to be refreshed when the underlying data that were used to compute the cached data objects have changed in order to maintain the consistency of the cached data objects. Specifically in the present process, by way of reference to methodology 500 of FIG. 5, in step 502 a determination is made as to whether the underlying data that were used to compute a RDBMS data object in the RD cache have changed. If it is determined in step 502 that (yes), the underlying data that were used to compute a RDBMS data object in the RD cache have changed, then in step 504 the RDBMS must refresh it by recomputing the data object with the new the underlying data. Note that there are cases where the recomputation can be incremental, i.e., it does not need to carry out the entire computation for the original data object. For example, if the RDBMS data object in the RD cache is the average salary of m employees, the new average salary of employees after hiring n more employees can be computed as (old_average*m+total_salary_of n_new_employees)/(m+n). Note that this computation only requires accessing the salaries of the n newly hired employees. It does not require accessing the salaries of the m old employees. Therefore, it is an incremental computation. On the other hand, if it is determined in 502 that (no) the underlying data has not changed, then the process ends.

Figure 5:
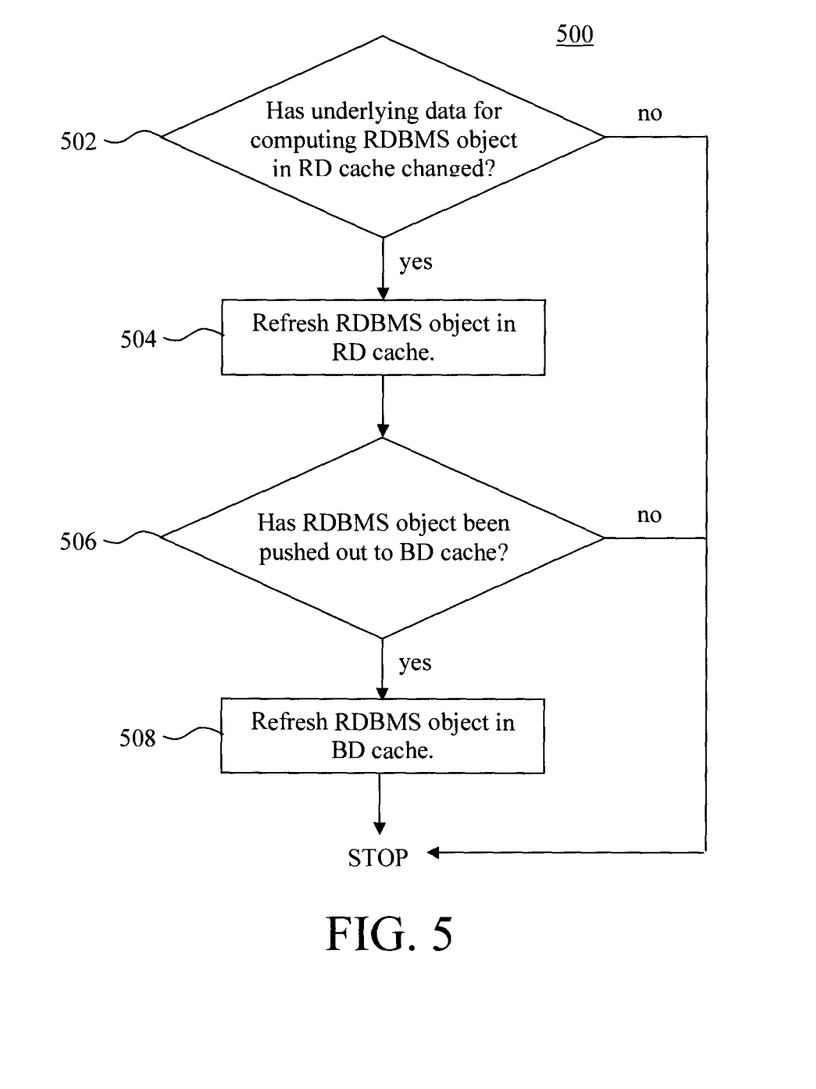
FIG. 5 is a diagram illustrating an exemplary methodology for refreshing data objects in the RD cache according to an embodiment of the present invention.

In step 506, a determination is then made as to whether the RDBMS data object has been pushed out to a BD cache. If it is determined in step 506 that (yes) the RDBMS data object has been pushed out to a BD cache, then in step 508 the refreshed data object (from step 504) is transferred to the BD cache. On the other hand, if it is determined in step 506 that (no) the RDBMS data object has not been pushed out to a BD cache, then the process ends.

Figure 6:
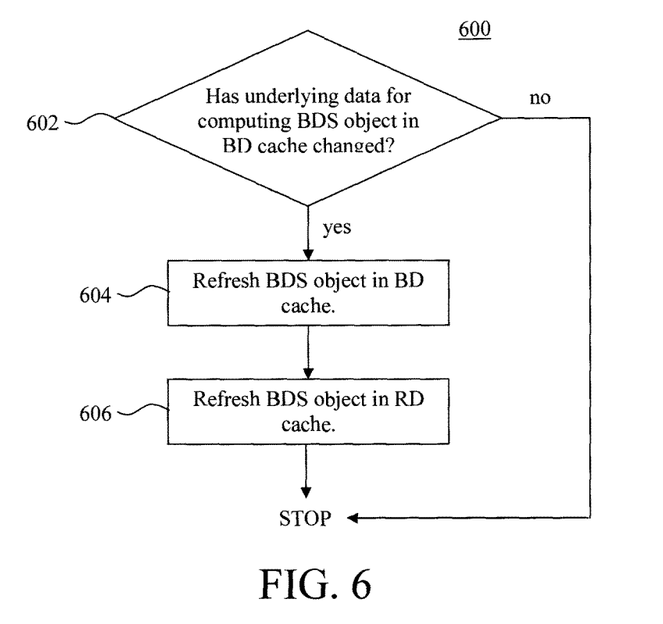
FIG. 6 is a diagram illustrating an exemplary methodology for refreshing data objects in the BD cache according to an embodiment of the present invention.

A similar process is carried out with respect to the BDS data objects. See, for example, methodology 600 of FIG. 6. In step 602, a determination is made as to whether the underlying data that were used to compute a BDS data object in the BD cache have changed. If it is determined in step 602 that (yes) the underlying data that were used to compute a BDS data object in the BD cache have changed, then in step 604 the BDS refreshes it by recomputing the data object with the new underlying data. In step 606, the refreshed object is also transformed and transferred to the RD cache. On the other hand, if it is determined in 602 that (no) the underlying data that were used to compute a BDS data object in the BD cache has not changed, then the process ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
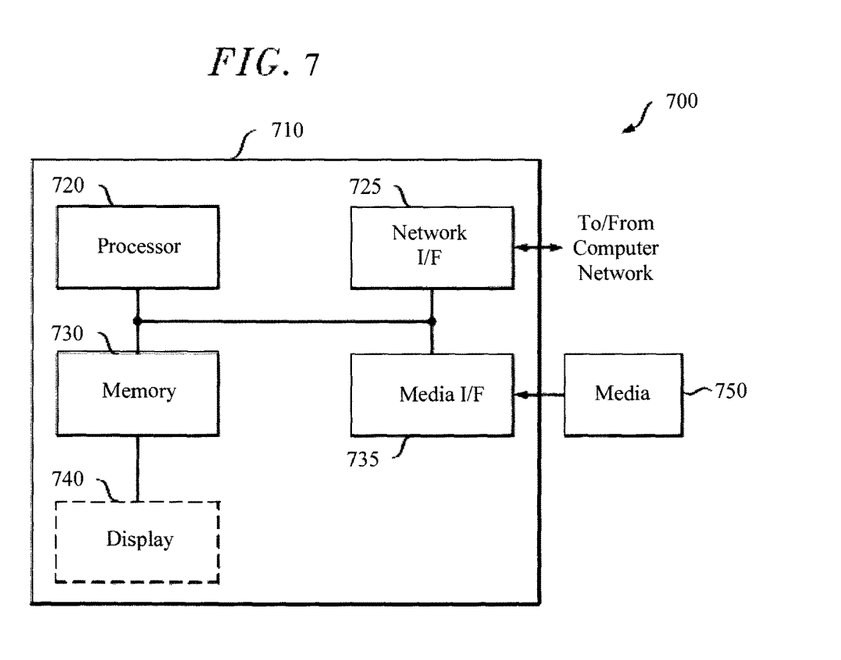
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. By way of example only, apparatus 700 can be configured to implement one or more of the steps of methodology 200 of FIG. 2, one or more of the steps of methodology 300 of FIG. 3, one or more of the steps of methodology 400 of FIG. 4, one or more of the steps of methodology 500 of FIG. 5, and/or one or more of the steps of methodology 600 of FIG. 6.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for processing a query involving data objects both in a Relational Database Management System (RDBMS) and in a Big Data System (BDS), the method comprising the steps of:

parsing the query into requests for RDBMS data objects and BDS data objects, wherein the RDBMS hosts structured data and the BDS hosts structured, semi-structured and unstructured data, and wherein the query involves joining the data objects in the RDBMS and the BDS;

determining whether the RDBMS data objects are present in a RDBMS cache;

retrieving the RDBMS data objects from the RDBMS cache if the RDBMS data objects are present in the RDBMS cache, otherwise determining whether the RDBMS data objects are present in a BDS cache;

retrieving the RDBMS data objects from the BDS cache if the RDBMS data objects are present in the BDS cache, otherwise computing the RDBMS data objects;

determining whether the BDS data objects are present in the RDBMS cache;

retrieving the BDS data objects from the RDBMS cache if the BDS data objects are present in the RDBMS cache, otherwise retrieving the BDS data objects: from the BDS cache if the BDS data objects are present in the BDS cache, or as computed by the BDS if the BDS data objects are not present in the BDS cache.

2. The method of claim 1, wherein the RDBMS cache is a host cache, and the BDS cache is a distributed cache.

3. The method of claim 1, further comprising the steps of: storing the computed RDBMS data objects in the RDBMS cache.

4. The method of claim 1, further comprising the step of: storing the computed BDS data object in both the RDBMS cache and the BDS cache.

5. The method of claim 1, further comprising the step of: transforming the computed BDS data objects into a RDBMS-compatible form.

6. The method of claim 5, wherein the RDBMS data objects are computed by a RDBMS engine and the BDS data objects are computed by a BDS engine, and wherein the BDS engine performs the step of transforming the computed BDS data objects into a RDBMS-compatible form.

7. The method of claim 6, wherein the BDS engine is Distributed Relational Database Architecture (DRDA)-enabled.

8. The method of claim 1, further comprising the step of: joining the RDBMS data objects and the BDS data objects.

9. The method of claim 1, further comprising the steps of: computing a score for each of the RDBMS data objects in the RDBMS cache;
selecting a RDBMS data object in the RDBMS cache with a highest score;
determining whether a cost to compute the selected RDBMS data object is greater than a cost to transfer the selected RDBMS data object from the BDS cache; and
transferring the selected RDBMS data object from the BDS cache if the cost to compute the selected RDBMS data object is greater than the cost to transfer the selected RDBMS data object from the BDS cache, otherwise evicting the selected RDBMS data object from the RDBMS cache.

10. The method of claim 9, further comprising the step of: determining whether there is enough room in the RDBMS cache after performing the transferring or evicting steps.

11. The method of claim 10, further comprising the step of:
repeating the steps of claim 9 with a data object in the RDBMS cache having a next highest score if it is determined that there is not enough room in the RDBMS cache after performing the transferring or evicting steps.

12. The method of claim 1, further comprising the steps of:
computing a score for each of the BDS data objects in the BDS cache;
selecting a BDS data object in the BDS cache with a highest score;
evicting the selected BDS data object from the BDS cache; and
evicting the selected BDS data object from the RDBMS cache.

13. The method of claim 12, further comprising the step of:
determining whether there is enough room in the BDS cache after performing the evicting steps.

14. The method of claim 13, further comprising the step of:
repeating the steps of claim 12 with a data object in the BDS cache having a next highest score if it is determined that there is not enough room in the BDS cache after performing the evicting steps.

15. The method of claim 1, further comprising the steps of:
determining if underlying data for computing a given one or more of the RDBMS data objects in the RDBMS cache has changed; and
refreshing the given one or more RDBMS data objects in the RDBMS cache if the underlying data have changed.

16. The method of claim 15, wherein the given one or more RDBMS data objects in the RDBMS cache have been refreshed, the method further comprising the steps of:
determining if the given one or more RDBMS data objects have been pushed out to the BDS cache; and
refreshing the given one or more RDBMS data objects in the BDS cache if the given one or more RDBMS data objects have been pushed out to the BDS cache.

17. The method of claim 1, further comprising the steps of:
determining if underlying data for computing a given one or more of the BDS data objects in the BDS cache has changed;
refreshing the given one or more BDS data objects in the BDS cache if the underlying data have changed; and
refreshing the given one or more BDS data objects in the RDBMS cache if the underlying data have changed.

18. A computer program product for processing a query involving data objects both in a RDBMS and in a BDS, the computer program product comprising a computer readable storage medium having program instructions embodied therewith, the program instructions executable by a computer to cause the computer to:
parse the query into requests for RDBMS data objects and BDS data objects, wherein the RDBMS hosts structured data and the BDS hosts structured, semi-structured and unstructured data, and wherein the query involves joining the data objects in the RDBMS and the BDS;
determine whether the RDBMS data objects are present in a RDBMS cache;
retrieve the RDBMS data objects from the RDBMS cache if the RDBMS data objects are present in the RDBMS cache otherwise determine whether the RDBMS data objects are present in a BDS cache;
retrieve the RDBMS data objects from the BDS cache if the RDBMS data objects are present in the BDS cache, otherwise compute the RDBMS data objects;
determine whether the BDS data objects are present in the RDBMS cache;
retrieve the BDS data objects from the RDBMS cache if the BDS data objects are present in the RDBMS cache, otherwise retrieve the BDS data objects: from the BDS cache if the BDS data objects are present in the BDS cache, or as computed by the BDS if the BDS data objects are not present in the BDS cache.

19. The computer program product of claim 18, wherein the RDBMS cache is a host cache, and the BDS cache is a distributed cache.

20. An integrated data processing (IDP) system, comprising:
a RDBMS engine comprising a host RDBMS cache; and
a BDS engine comprising a distributed BDS cache,
wherein the RDBMS engine is configured via a processor, coupled to a memory, to parse a query into requests for RDBMS data objects and BDS data objects, wherein the RDBMS hosts structured data and the BDS hosts structured, semi-structured and unstructured data, and wherein the query involves joining data objects in the RDBMS and the BDS, determine whether the RDBMS data objects are present in a RDBMS cache, retrieve the RDBMS data objects from the RDBMS cache if the RDBMS data objects are present in the RDBMS cache, otherwise determine whether the RDBMS data objects are present in a BDS cache, retrieve the RDBMS data objects from the BDS cache if the RDBMS data objects are present in the BDS cache, otherwise compute the RDBMS data objects, determine whether the BDS data objects are present in the RDBMS cache, and retrieve the BDS data objects from the RDBMS cache if the BDS data objects are present in the RDBMS cache, otherwise retrieve the BDS data objects: from the BDS cache if the BDS data objects are present in the BDS cache, or as computed by the BDS engine if the BDS data objects are not present in the BDS cache.

* * * * *